United States Patent [19]  
Cantrell et al.

[11] 4,256,326  
[45] Mar. 17, 1981

[54] LIFTABLE TANDEM AXLE SUSPENSION

[75] Inventors: Ronald T. Cantrell; Blaine H. Allison, both of Gainesville, Ga.

[73] Assignee: Allison Mfg., Inc., Gainesville, Ga.

[21] Appl. No.: 893,505

[22] Filed: Apr. 4, 1978

Related U.S. Application Data

[63] Continuation-in-part of Ser. No. 847,479, Nov. 1, 1977, and a continuation-in-part of Ser. No. 705,146, Jul. 14, 1976, Pat. No. 4,082,305.

[51] Int. Cl.³ .............................................. B60G 5/00
[52] U.S. Cl. ..................................... 280/683; 280/712
[58] Field of Search ............... 280/683, 712, 676, 685, 280/711; 180/24.02

[56] References Cited

U.S. PATENT DOCUMENTS

| | | | |
|---|---|---|---|
| 2,865,649 | 12/1958 | Chalmers | 280/683 |
| 3,096,995 | 7/1963 | Richnow | 180/24.02 |
| 3,340,946 | 9/1967 | Whitehead | 280/683 |
| 3,542,393 | 11/1970 | Verdi | 280/683 |
| 3,694,001 | 9/1972 | McGee | 280/712 |

FOREIGN PATENT DOCUMENTS 1132012  6/1962  Fed. Rep. of Germany ........... 280/683

Primary Examiner—Randolph A. Reese  
Assistant Examiner—Ross Weaver  
Attorney, Agent, or Firm—B. J. Powell

[57] ABSTRACT

A liftable tandem axle suspension for a trailer including a central trunion frame mounted on the trailer frame, a front non-liftable axle assembly pivotally mounted on the central trunion frame and extending forwardly thereof, and a rear liftable axle assembly pivotally mounted on the central trunion frame and extending rearwardly thereof so that the rear axle assembly can be lifted when the trailer is not loaded.

3 Claims, 3 Drawing Figures

LIFTABLE TANDEM AXLE SUSPENSION

CROSS-REFERENCE TO RELATED APPLICATIONS

This application is a continuation-in-part of co-pending applications Ser. No. 705,146 filed July 14, 1976, now U.S. Pat. No. 4,082,305, entitled "AUXILIARY AXLE ASSEMBLY"; and Ser. No. 847,479 filed Nov. 1, 1977, entitled "CHAIN LIFT FOR AUXILIARY AXLE ASSEMBLY".

BACKGROUND OF THE INVENTION

Liftable auxiliary axle assemblies have frequently been used on vehicles to increase the load carrying capacity of the vehicle without increasing the maximum permissible load on each wheel and tire assembly of the vehicle as regulated by state law. Most of these liftable auxiliary axle assemblies have been limited to the vehicle prime mover section such as the tractor of a semi-trailer rig or a fixed bed truck and have not been practically applicable to truck trailers, especially semi-trailers. While several of the prior art patents such as U.S. Pat. No. 3,689,102 illustrate a liftable auxiliary axle assembly applied to a semi-trailer, these illustrated applications have met with virtually no practical commercial success. This lack of practical commercial success with liftable auxiliary axles is due in large part to the physical geometry of a semi-trailer/tractor connection which will subject the liftable auxiliary axle assembly to excessive size loading.

As a result of these problems, semi-trailers have by and large been relegated to the use of the typical non-liftable tandem axle suspensions as the trailer suspension system. While these tandem axle suspension systems are usually required when the semi-trailer is loaded, they are generally not required when the trailer is empty. Because these semi-trailers have not used non-liftable tandem axle suspension, unnecessary tire wear has been encountered on the tires of at least one of the axles of the tandom axle suspension. Further, because of the geometry of the connection between the semi-trailer and the tractor pulling it, both the trailer frame and the tandem axle suspension were subjected to relatively high side loads all the time the trailer is being operated regardless of whether it is loaded or empty. This again reduces the fatigue life of the material used in the fabrication of the trailer frame and the tandem suspension.

SUMMARY OF THE INVENTION

These and other problems and disadvantages associated with prior art tandem trailer suspensions are overcome by the invention disclosed herein by providing a tandem trailer suspension in which one of the axles is non-liftable while the other of the axles is liftable. In other words, the liftable tandem axle suspension of the invention is used to replace the conventional non-liftable tandem axle suspension associated with the trailer. This allows tire wear and side loading to be minimized since the liftable axle can be lifted to remove the tires carried by the liftable axle from the road when the extra load carrying capability is not needed. This is especially helpful in trailers which travel for a significant portion of their time in an empty condition such as that frequently encountered with trailers used to haul automobiles and light trucks. This is because these trailers are extremely light when empty as compared to other types of trailers used to transport other types of goods. Also, the liftable tandem axle suspension of the invention effectively reduces the distance between the road contacting tires carried by the non-liftable axle and the tractor pulling the trailer to increase maneuverability. Further, the liftable tandem axle suspension of the invention minimizes the space required for the suspension system on the trailer while at the same time maximimzing the distribution of the load on the trailer frame when the liftable axle is lowered into road engaging contact.

The liftable tandem axle suspension of the invention includes generally a central trunion frame which is fixedly mounted on the trailer frame at the position for properly supporting the load. A front non-liftable axle assembly is pivotally mounted on the central trunion frame and extends forwardly thereof to selectively spring the trailer frame. A rear liftable axle assembly is also pivotally mounted on the central trunion frame but extends rearwardly therefrom to selectively spring the trailer frame when the liftable axle assembly is lowered into contact with the road while at the same time allowing the liftable axle assembly to be lifted out of contact with the road when the additional load carrying capacity is not required.

Each of the axle assemblies includes a pair of spaced apart torque arm assemblies pivotally mounted about a common pivot axis generally normal to the longitudinal vehicle axis on the central trunion frame. The projecting end of the torque arm assemblies mounts the axle thereon so that the alignment of the axle is adjustable with respect to the torque arm assemblies. Suspension air bag springs are provided which spring the axle carried by the pair of torque arm assemblies when inflated.

To lift the liftable axle assembly, coil springs are provided which connect the liftable axle with the trunion frame so that when the air bag springs are deflated, the coil springs will lift the liftable axle assembly out of contact with the road.

These and other features and advantages of the invention disclosed herein will become more apparent upon consideration of the following specification and accompanying drawings wherein like characters of reference designate corresponding parts throughout the several views and in which:

BRIEF DESCRIPTION OF ILLUSTRATIVE DRAWINGS

These figures and the following detailed description disclose specific embodiments of the invention, however, it is to be understood that the inventive concepts are not limited thereto since they may be embodied in other forms.

DETAILED DESCRIPTION OF ILLUSTRATIVE EMBODIMENTS

Figure 1:
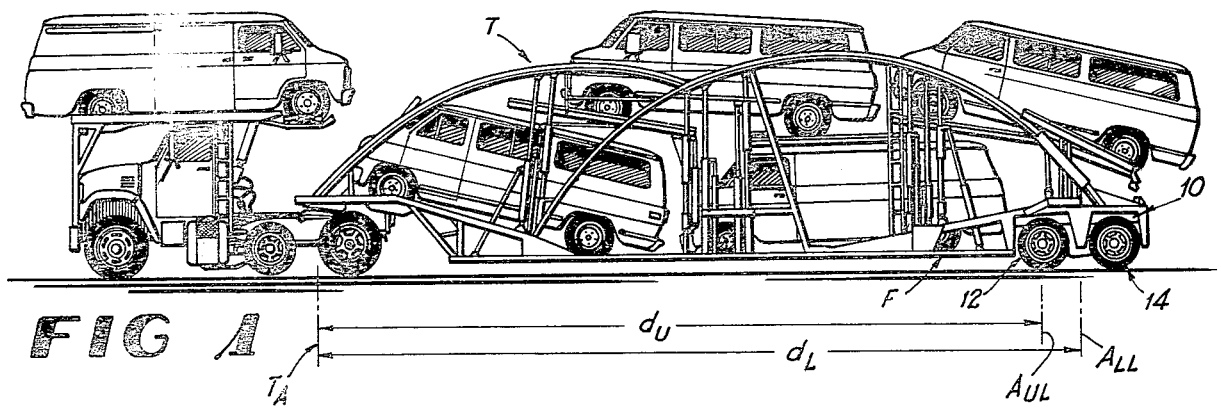
FIG. 1 is a side elevational view illustrating the invention installed on a semi-trailer.

Referring to the figures, it will be seen that the liftable tandem axle suspension 10 is adapted to be mounted on a trailer T in lieu of the tandem axle suspension normally associated with the trailer and is shown in FIG. 1 as installed on a trailer for hauling automobiles and light trucks. The trailer T has a main frame F including a pair of spaced apart longitudinally extending trailer frame side members SM seen in FIG. 2 which extend across the position on the trailer T at which the liftable tandem axle suspension 10 is to be mounted. It will further be noted that the trailer is normally movable along its longitudinal axis $A_T$.

Figure 2:
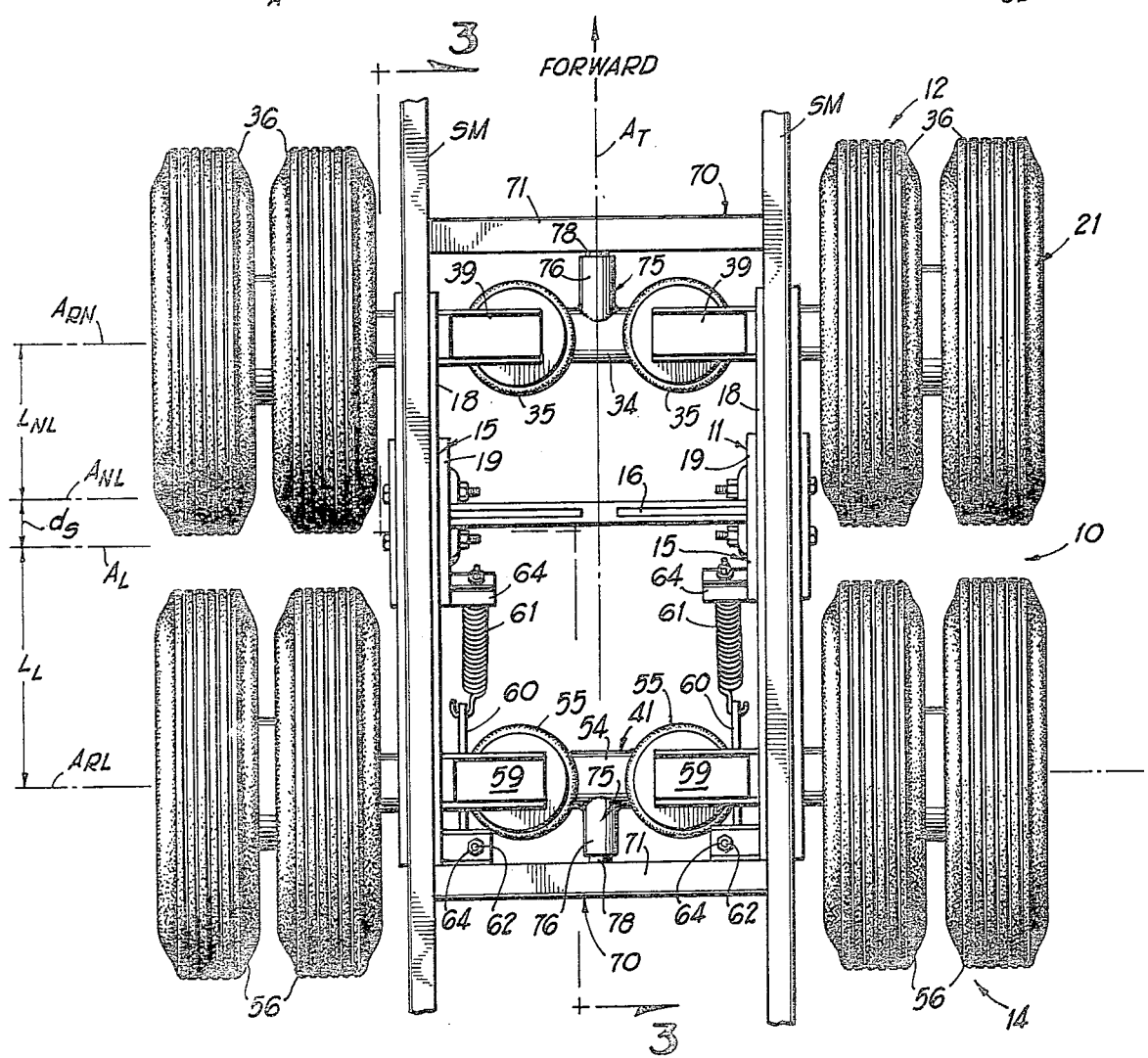
FIG. 2 is an enlarged top elevational view of the invention.
Figure 3:
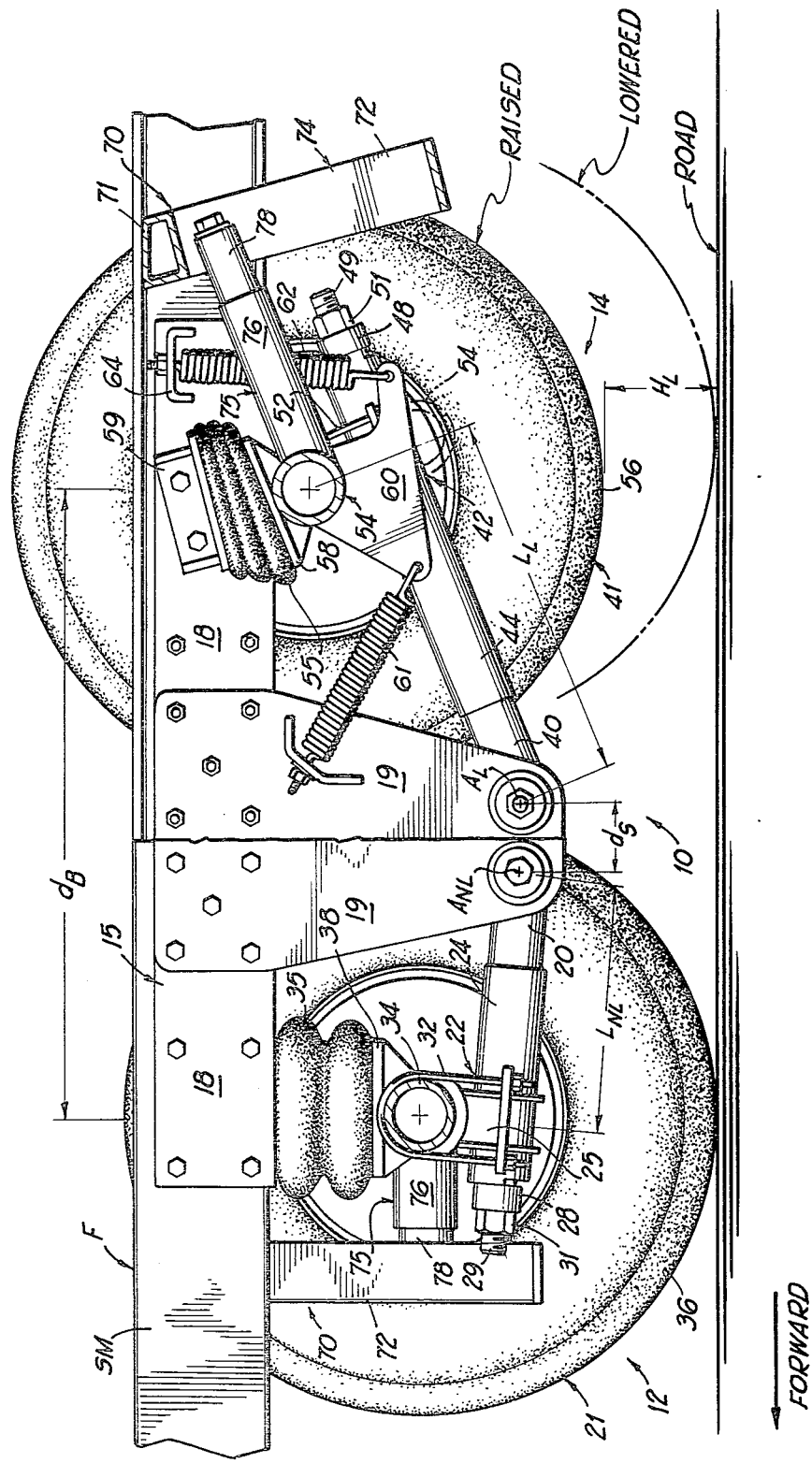
FIG. 3 is an enlarged side elevational view of the invention taken generally along the line 3—3 in FIG. 2.

The tandem axle suspension 10 comprises generally a central trunion frame 11 which is mounted on the trailer frame side members SM as seen in FIGS. 2 and 3. The cetral trunion frame 11 mounts a non-liftable axle assembly 12 forwardly thereon and mounts a liftable axle assembly 14 rearwardly thereon so that the liftable axle assembly can be raised out of road engaging contact. The central trunion frame 11 includes a pair of trunion sections 15, one being mounted on each of the side members SM which are in turn connected by a cross member 16 as best seen in FIG. 2. Each trunion section 15 includes a side rail 18 which extends along and is attached to the side members SM of the trailer frame F and a trunion beam 19 mounted on the side rail 18 and depending therebelow under the trailer frame side member SM. Both the non-liftable axle assembly 12 and the liftable axle assembly 14 are mounted on the depending ends of the trunion beams 19.

The non-liftable axle assembly 12 as seen in FIG. 3 includes a pair of torque arms 20, one end of each being pivotally mounted on the depending end of the forward portion of one of the trunion beams 19 so that the torque arms 20 project forwardly of the trunion beams 19 and pivot about a common horizontal non-liftable pivot axis $A_{NL}$ oriented normal to the longitudinal axis $A_T$ of the trailer T. The forwardly projecting ends of the torque arms 20 mount a non-liftable wheel and axle assembly 21 therebetween under the trailer frame F.

Each torque arm 20 is connected to the non-liftable wheel and axle assembly 21 through an axle seat assembly 22 as seen in FIG. 3. Each axle seat assembly 22 includes a mounting tube 24 slidably received over the torque arm 20 and mounting an axle seat 25 thereon. The mounting tube 24 is adjustably fixed axially along the torque arm 20 by an internally threaded adjustment member 28 rotatably connected to, but axially fixed with respect to, the mounting tube 24. The adjustment member 28 is screwed onto a stud 29 extending from the forwardly projecting end of the torque arm 20 and is locked in place by a lock nut 31. U-bolts 32 lock the axle 34 of the wheel and axle assembly 21 onto each axle seat 25.

A pair of air bag springs 35 positioned directly above the axle 34 spring the non-liftable wheel and axle assembly 21 as the tires 36 on the assembly 21 are maintained in contact with the road at all times. An appropriate axle mounting brackets 38 connects the air bag springs 35 to the axle 34 while frame mounting brackets 39 connect the air bag springs 35 to the central trunion frame 11 inside the side members SM of the trailer T as best seen in FIG. 2.

The liftable axle assembly 14 includes a pair of torque arms 40, one end of each being pivotally mounted on the depending end of the rear portion of one of the trunion beams 19 so that the torque arms 40 project rearwardly of the trunion beams 19 and pivot about a common horizontal liftable pivot axis $A_L$ oriented normal to the longitudinal axis $A_T$ of the trailer T parallel to axis $A_{NL}$ and spaced a distance $d_s$ therefrom. The rearwardly projecting ends of the torque arms 40 mount a liftable wheel and axle assembly 41 therebetween under the trailer frame F. Each torque arm 40 is connected to the liftable wheel and axle assembly 41 through an axle seat assembly 42 as seen in FIG. 3 similar to the axle seat assemblies 22. Axle seat assembly 42 also includes a mounting tube 44 slidably received over the torque arm 40 and which mounts an axle seat thereon. The mounting tube 44 is adjustably fixed axially along the torque arm 40 by an internally threaded adjustment member 48 rotatably connected to, but axially fixed with respect to, the mounting tube 44. The adjustment member 48 is screwed onto a stud 49 extending from the rearwardly projecting end of the torque arm 40 and locked in place by a lock nut 51. U-bolts 52 lock the axle 54 of the wheel and axle assembly 41 onto each axle seat. A pair of air bag springs 55 positioned directly above the axle 54 spring the liftable wheel and axle assembly 41 when the tires 56 on the assembly 41 are in contact with the road. An appropriate axle mounting bracket 58 connects the air bag springs 55 to the axle 54 while frame mounting brackets 59 connect the air bag springs 55 to the central trunion frame 11 inside the side members SM of the trailer T as best seen in FIG. 2. A hangar plate 60 seen in FIG. 3 is also connected to both the axle seat assembly 42 and axle 54 on the inboard side of each axle seat assembly 42 for use in lifting the liftable wheel and axle assembly 41 out of contact with the road.

A pair of coil springs 61 and 62 are connected to each hangar plate 60 for lifting the liftable auxiliary wheel and axle assembly 41 out of contact with the road when the air bag springs 55 are deflated. It will be seen that both of the coil springs 61 and 62 are located inboard of the trailer frame side member SM to allow maximum spacing between the trailer frame side members SM. The coil spring 61 is located forwardly of the axle 54 while the coil spring 62 is located rearwardly of the axle 64. It will be noted that the coil spring 62 is oriented generally vertically while the coil spring 61 is oriented at an angle of about 45°. The upper end of each of the coil springs 61 and 62 is connected to an appropriate spring bracket 64 on the central trunion frame 11 inboard of the side member SM. Thus, when the operator of the trailer wants to lower the liftable wheel and axle assembly 41 into contact with the road surface, he simply inflates the air bag springs 55 which forces the tires 56 into contact with the road surface by overriding the force of the coil springs 61 and 62.

Both the non-liftable axle assembly 12 and the liftable axle assembly 14 are equipped with a lateral movement limiting assembly 70 which serves to limit the side-to-side movement of the wheel and axle assembly 21 and 41 as the trailer turns. Such movement is commonly known as axle walkout. The lateral movement limiting assembly 70 associated with the non-liftable axle assembly 14 is located forwardly of the non-liftable axle 34 while the lateral movement limiting assembly 70 associated with the liftable axle assembly 14 is located rearwardly of the liftable axle 54.

Each of the lateral movement limiting assemblies 70 includes a cross member 71 mounted between the frame side members SM of the trailer as illustrated or between the side rails 18 of the trunion sections 15 adjacent the axle which is sought to be controlled. A U-shaped guide 72 depends from the cross member 71 and defines a vertically oriented guide slot 74 therein through which an alignment assembly 75 projects with the alignment assembly 75 being fixedly mounted on the axle which is being controlled by the particular lateral movement limiting assembly 70. The alignment assembly 75 may have a fixed section 76 which is fixedly mounted on the axle associated therewith and may rotatably mount a guide roller 78 on the projecting end of the fixed section 76 that extends into the slot 74 in the U-shaped guide 72 so that the guide roller 78 rides along the slot 74 to limit the side-to-side movement of the axle associated therewith.

From the foregoing, it will be seen that the effective torque arm length $L_{NL}$ of the non-liftable axle assembly 12 may be different than the effective torque arm length $L_L$ of the liftable axle assembly 14. This difference in effective torque arm lengths does not affect the suspension capability or the load distribution capability of the tandem axle suspension 10 since the load transmitted from the axle assemblies 12 and 14 to the trailer frame F is virtually all transferred through the air bag springs 35 and 55. The net effect of this construction is that the effective torque arm lengths $L_{NL}$ and $L_L$ can be appropriately adjusted to provide the necessary lifting height $H_L$ shown in FIG. 3 for the liftable axle assembly 14 while still keeping the overall dimensions of the suspension 10 at a minimum. This type suspension further allows the spreading of the load transferred to the trailer frame F to be maximized since the air bags 35 and 55 can be located a maximum distance $d_B$ apart as seen in FIG. 3. It is also to be understood that, where space permits, the air bag spring 35 could be located forwardly of the non-liftable axle 34 while the air bag spring 55 could be located rearwardly of the liftable axle 54 to further spread the load transmitted to the trailer frame F by the suspension 10. In the particular application of the suspension assembly 10 to a trailer T for use in transporting automobiles and light trucks as illustrated in the drawings, this design permits the suspension assembly 10 to fit within the allocated space in the trailer T for the suspension assembly 10. In the past, this has been a significant problem since the axle-to-axle spacing has been limited to about 48". The suspension 10 easily accommodates the spacing while at the same time maximizes the distribution of the load transmitted to the trailer frame F. In the particular embodiment illustrated, the effective torque arm length $L_L$ for the liftable axle assembly 14 is about 26" to provide the necessary pivoting geometry while the effective torque arm length $L_{NL}$ of the non-liftable axle assembly 12 is about 18" to provide the necessary pivoting geometry for the axle assembly 12.

The rotational axis $A_{RN}$ of the tires 36 on the non-liftable axle assembly 12 can be shifted using the adjustment members 28 to orient the axis $A_{RN}$ normal to the trailer axis $A_T$ for alignment. Similarly, the rotational axis $A_{RL}$ of the tires 56 on the liftable axle assembly 14 can be shifted using the adjustment members 58 to orient the axis $A_{RL}$ normal to the trailer axis $A_T$ for alignment.

It will be noted that the liftable axle assembly 14 is located rearwardly of the non-liftable axle assembly 12. Referring to FIG. 1, it will be seen that the trailer T pivots about a trailer pivot axis $T_A$ on the tractor pulling the trailer. When the liftable axle assembly 14 is lowered into ground engaging contact with the road as seen in FIG. 1, and assuming that the liftable and non-liftable axle assemblies 14 and 12 are equally loaded, the trailer will try to turn about an axis $A_{LL}$ as seen in FIG. 1 which is located at the midpoint between the axle-to-axle spacing of the non-liftable and liftable axle assemblies 12 and 14. When the liftable axle assembly 14 is lifted, however, it will be seen that the trailer will then try to turn about the axis $A_{UL}$ also seen in FIG. 1 which is aligned with the tire rotational axis $A_{RN}$ of the non-liftable axle assembly 12. Because the non-liftable axle assembly 12 is located a shorter distance $d_U$ from the trailer pivot axis $T_A$ versus the longer distance $d_L$ of the axis $A_{LL}$, it will be seen that trailer T now has an effective shorter turning radius. This serves to increase the maneuverability of the truck/trailer combination as will be appreciated. Further, it will be noted that, when the liftable axle assembly 14 is lifted out of road engagement contact, side loading of the non-liftable axle assembly 12 will be minimized to significantly reduce the tire wear on both the liftable axle assembly 14 and the non-liftable axle assembly 12.

I claim:

1. A tandem axle suspension for a trailer mounted on the trailer frame within a limited suspension mounting space adjacent the rear end of the trailer comprising:

a trunion frame fixedly mounted on the trailer frame within the limited suspension mounting space and including spaced apart trunion beams depending below the trailer frame;

a non-liftable axle assembly pivotally mounted on said trunion beams about a generally horizontal first common pivot axis oriented normal to the longitudinal axis of the trailer and extending forwardly of said trunion beams within the limited suspension mounting space; and a liftable axle assembly pivotally mounted on said trunion beams about a generally horizontal second common pivot axis oriented normal to the longitudinal axis of the trailer and extending rearwardly of said trunion beams within the limited suspension mounting space for operation independently of said non-liftable axle assembly;

said non-liftable axle assembly including a pair of first torque arms pivotally mounted on said trunion beams about the first common pivot axis and extending forwardly thereof within the limited suspension mounting space, each of said first torque arms having a first prescribed effective length, defining a projecting end thereon, and including a threaded stud at the projecting end thereof; a first wheel and axle assembly; a pair of first seat assemblies one of said first seat assemblies mounted on the projecting end of each of said first torque tubes, said pair of said first seat assemblies mounting said first wheel and axle assembly therebetween so that said axle is generally perpendicular to the longitudinal axis of the trailer, each of said first seat assemblies including a first support tube slidably received on one of said pair of first torque arms for axial movement along said first torque arm; a pair of first internally threaded members, each of said first internally threaded members rotatably connected to, but axially fixed with respect to, said first support tube of one of said first axle seat assemblies and threadedly engaging said stud on said first torque arm mounting said first axle seat assembly so that rotation of said first internally threaded members adjusts the alignment of said first wheel and axle assembly by positively shifting said first axle seat assemblies axially along said first torque arms; and a pair of first air bag springs operatively connecting said first wheel and axle assembly to the trailer frame to spring same;

said liftable axle assembly including a pair of second torque arms pivotally mounted on said trunion beams about the second common pivot axis and extending rearwardly thereof within the limited suspension mounting space each of said second torque arms having a second prescribed effective length, greater than the first prescribed effective length of said first torque arms, defining a projecting end thereon, and including a threaded stud at the projecting end thereof; a second wheel and axle assembly; a pair of spaced apart second seat assemblies one of said second seat assemblies mounted on the projecting end of each of said second torque tubes, said pair of said second seat assemblies mounting said first wheel and axle assembly therebetween so that said axle is generally perpendicular to the longitudinal axis of the trailer, each of said second seat assemblies including a second support tube slidably received on one of said pair of second torque arms for axial movement along said second torque arm; a pair of second internally threaded members, each of said second internally threaded members rotatably connected to, but axially fixed with respect to, said second support tube of one of said second axle seat assemblies and threadedly engaging said stud on said second torque arm mounting said second axle seat assembly so that rotation of said second internally threaded members adjusts the alignment of said second wheel and axle assembly by positively shifting said second axle seat assemblies axially along said second torque arms; a pair of second air bag springs operatively connecting said second wheel and axle assembly to the trailer frame to spring same; and lift means for selectively lifting said second wheel and axle assembly out of road engagement when said second air bag springs are deflated.

2. The tandem axle suspension of claim 1 wherein said non-liftable axle assembly includes a first lateral movement limiting assembly for limiting the sidewise movement of said first wheel and axle assembly with respect to the trailer frame while permitting vertical movement of said first wheel and axle assembly with respect to the trailer frame; and wherein said liftable axle assembly includes a second lateral movement limiting assembly for limiting the sidewise movement of said second wheel and axle assembly with respect to the trailer frame while permitting vertical movement of said second wheel and axle assembly with respect to the trailer frame.

3. The tandem axle suspension of claim 1 wherein said lift means includes a plurality of coil springs.

* * * * *